(12) United States Patent
Xu et al.

(10) Patent No.: US 11,878,677 B2
(45) Date of Patent: *Jan. 23, 2024

(54) METHOD AND SYSTEM FOR PROVIDING TORQUE TO CLUTCH IN HYBRID VEHICLE

(71) Applicant: Ford Global Technologies, LLC, Dearborn, MI (US)

(72) Inventors: Yang Xu, Dearborn, MI (US); Akshay Bichkar, Ann Arbor, MI (US); Zhengyu Dai, Canton, MI (US); Hiral Jayantilal Haria, Ypsilanti, MI (US); Hong Jiang, Birmingham, MI (US); Jason Meyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,265

(22) Filed: Jan. 30, 2023

(65) Prior Publication Data

US 2023/0166721 A1 Jun. 1, 2023

Related U.S. Application Data

(63) Continuation of application No. 17/330,315, filed on May 25, 2021, now Pat. No. 11,643,067.

(51) Int. Cl.
*B60W 20/40* (2016.01)
*F16D 48/06* (2006.01)

(52) U.S. Cl.
CPC .......... *B60W 20/40* (2013.01); *F16D 48/066* (2013.01); *B60W 2710/083* (2013.01); *F16D 2500/1064* (2013.01); *F16D 2500/10412* (2013.01); *F16D 2500/3024* (2013.01); *F16D 2500/3025* (2013.01); *F16D 2500/3065* (2013.01); *F16D 2500/30412* (2013.01)

(58) Field of Classification Search
CPC .............................................. F16D 2500/3025
See application file for complete search history.

(56) References Cited

U.S. PATENT DOCUMENTS 11,643,067 B2 * 5/2023 Xu .................. F16D 48/066
701/22

* cited by examiner

*Primary Examiner* — Timothy Hannon
(74) *Attorney, Agent, or Firm* — Burris Law, PLLC

(57) ABSTRACT

A method includes estimating a first pressure at a first location of a clutch based on a flow rate of a fluid in the clutch, computing a first torque lead value based on the first pressure, computing a second torque lead value based on a second pressure, computing a third torque lead value by combining the first torque lead value and the second torque lead value, and applying torque from a motor of the vehicle based on the third torque lead value.

20 Claims, 8 Drawing Sheets

METHOD AND SYSTEM FOR PROVIDING TORQUE TO CLUTCH IN HYBRID VEHICLE

CROSS-REFERENCE TO RELATED APPLICATIONS

This application is a continuation of U.S. patent application Ser. No. 17/330,315, filed May 25, 2021 and titled "METHOD AND SYSTEM FOR PROVIDING TORQUE TO CLUTCH IN HYBRID VEHICLE", the contents of which are incorporated herein by reference in its entirety.

FIELD

The present application is related to hybrid vehicles. The present application is related more particularly to managing transitions between electric and combustion driving modes.

BACKGROUND

The statements in this section merely provide background information related to the present disclosure and may not constitute prior art.

Hybrid vehicles include an electric motor and a combustion engine. The hybrid vehicles can be operated in various modes including being powered by the electric motor only, being powered by the combustion engine only, or being powered by both the electric motor and the combustion engine. Smooth transitions between the various modes can be difficult to manage. If the transition is not smooth, then the vehicle may experience sudden unwanted acceleration or deceleration.

SUMMARY

This section provides a general summary of the disclosure and is not a comprehensive disclosure of its full scope or all of its features.

In one form, the present disclosure provides a method including estimating a first pressure at a first location of a clutch based on a flow rate of a fluid in the clutch, computing a first torque lead value based on the first pressure, computing a second torque lead value based on a second pressure, computing a third torque lead value by combining the first torque lead value and the second torque lead value, and applying torque from a motor of the vehicle based on the third torque lead value.

In variations of the method of the above paragraph, which can be implemented individually or in any combination: the method further includes computing the third torque lead value with a powertrain control module coupled to the clutch and a combustion engine; the method further includes providing the third torque lead value from the powertrain control module to a hybrid powertrain control module of the vehicle; the method further includes controlling with the hybrid powertrain control module, the motor to provide the torque to the clutch based on the third torque lead value; the method further includes driving an axle of the vehicle with the motor prior to computing the third torque lead value, and enabling a combustion engine of the vehicle to drive the axle by coupling the combustion engine with a drivetrain of the vehicle with the clutch, the third torque lead value compensates for the clutch coupling the combustion engine to the drivetrain; the method further includes driving an axle with both a combustion engine and the motor after enabling the combustion engine to drive the axle; the method further includes generating the first and second torque lead values based, in part, on a time delay value corresponding to a delay in providing torque from the motor; the method further includes generating the first and second torque lead values based, in part, on the time delay value and a selected lead time value less than the time delay value; the method further includes generating the first torque lead value by generating a first pressure lead value based on a piston pressure and a selected lead time, and applying a transfer function to the first pressure lead value, and generating the second torque lead value by generating a second pressure lead value based on a pressure at a valve and the selected lead time, and applying a transfer function to the second pressure lead value; the flow rate of the fluid in the clutch of the vehicle is estimated by sensing a pressure of the fluid in a fluid line of the clutch; the second pressure is estimated at a second location of the clutch, the second location being different than the first location; the first location is at a piston of the clutch and the second location is at a valve of the clutch; and the first torque lead value is computed based on the first pressure and a selected lead time and the second torque lead value is computed based on the second pressure and the selected lead time.

In another form, the present disclosure provides a method including estimating a flow rate of a fluid in a clutch of a vehicle; estimating a first pressure at a first location of the clutch based on the flow rate; computing a first torque lead value based on the first pressure, a selected lead time value, and a delay time value; computing a second torque lead value based on a second pressure, the selected lead time value, and the delay time value, the second pressure is estimated at a second location of the clutch that is different than the first location; computing a third torque lead value by combining the first torque lead value and the second torque lead value; and applying torque from a motor of the vehicle based on the third torque lead value.

In variations of the method of the above paragraph, which can be implemented individually or in any combination: the method further includes computing the third torque lead value with a powertrain control module coupled to the clutch and a combustion engine; the method further includes providing the third torque lead value from the powertrain control module to a hybrid powertrain control module of the vehicle; the method further includes controlling, with the hybrid powertrain control module, the motor to provide the torque to the clutch based on the third torque lead value; the flow rate of the fluid in the clutch of the vehicle is estimated by sensing a pressure of the fluid in a fluid line of the clutch; and the first location is at a piston of the clutch and the second location is at a valve of the clutch.

In another form, the present disclosure provides a method including estimating a pressure at a piston of the clutch based on the flow rate; computing a first torque lead value based on the estimated pressure at the piston, a selected lead time value, and a delay time value; computing a second torque lead value based on a pressure at a valve of the clutch, the selected lead time value, and the delay time value; computing a third torque lead value by combining the first torque lead value and the second torque lead value; and applying torque from a motor of the vehicle to an axle of the vehicle based on the third torque lead value, the axle of the vehicle is driven by the motor prior to computing the third torque lead value.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
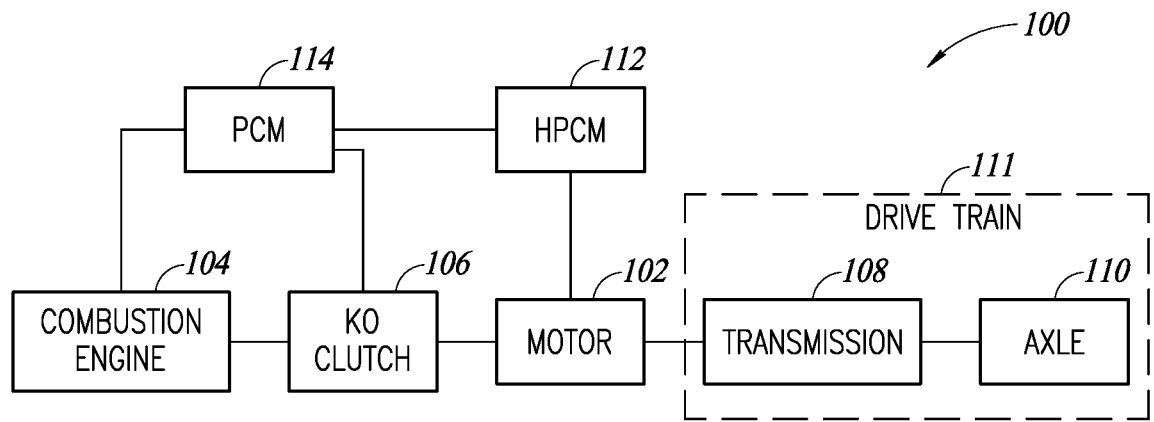
FIG. 1 is a block diagram of a hybrid vehicle, according to some embodiments.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

FIG. 1 is a block diagram of a hybrid vehicle 100, according to one embodiment. The hybrid vehicle 100 includes an electric motor 102 and a combustion engine 104 coupled together by a K0 clutch 106. As will be set forth in more detail below, the hybrid vehicle 100 manages smooth transitions between operational modes of the vehicle by using a combination of techniques to calculate a torque to be generated by the motor 102 during the transitions. The operational modes correspond to whether the motor 102, the combustion engine 104, or both the motor 102 and the combustion engine 104 power the vehicle 100.

The vehicle 100 includes a drivetrain 111. The drivetrain includes a transmission 108 and an axle 110. The motor 102 is coupled to the transmission 108. When the motor 102 powers the hybrid vehicle 100, the motor 102 applies torque to the axle 110 via the transmission 108. The transmission 108 and the axle 110 are part of the drivetrain of the hybrid vehicle 100. For simplicity in understanding principles of the present disclosure, the block diagram of FIG. 1 does not illustrate various other components that are part of the drivetrain 111. These other components are well understood by those of skill in the art.

The K0 clutch 106 can be operated to couple or decouple the combustion engine 104 from the drivetrain 111. If the vehicle 100 transitions from an operational mode that solely uses the motor 102 to an operational mode in which both the motor 102 and the combustion engine 104 power drivetrain 111, then the motor 102 will apply a torque to the K0 clutch 106. The torque moves internal mechanical components of the K0 clutch 106 to engage the combustion engine 104. The motor 102 also continues to generate a torque to drive the drivetrain 111. During the transition, the motor 102 generates sufficient torque to both continue driving the drivetrain 111 and to assist the K0 clutch 106 to engage the combustion engine 104.

If, during the transition, the motor 102 generates more torque that is needed to both account for drag caused by the K0 clutch 106 and to maintain the speed of the vehicle 100 by properly powering the drivetrain 111, then the additional torque will be applied to the drivetrain and may result in an unwanted acceleration of the vehicle 100. If, during the transition, the motor 102 does not generate enough torque to both make up for the drag caused by the K0 clutch 106 and to maintain the speed of the vehicle 100, then the torque supplied to the drivetrain 111 may not be sufficient to maintain the speed of the vehicle 100. This may result in an unwanted deceleration of the vehicle 100.

The vehicle 100 includes a hybrid powertrain control module (HPCM) 112. The HPCM 112 is coupled to the motor 102 and controls the operation of the motor 102. Among other functions, the HPCM 112 controls the amount of torque generated by the motor 102 and determines whether or not the motor 102 will assist the K0 clutch 106 to engage or disengage the combustion engine 104.

The vehicle 100 includes a powertrain control module (PCM) 114. The PCM 114 is coupled to the K0 clutch 106 and the combustion engine 104. The PCM 114 receives sensor signals from the K0 clutch 106, as will be described in more detail below. The PCM 114 controls the function of the combustion engine 104. The PCM 114 is communicatively coupled to the HPCM of 112.

The HPCM 112 and the PCM 114 are electronic control modules of the vehicle 100. The HPCM 112 and the PCM 114 can each include one or more computer readable memories. The memories can store software instructions for the operation of the HPCM 112 and the PCM 114. The memories can also store data related to current and past values of sensor signals, commands received from other control modules or vehicle components, commands to be transmitted to other control modules or vehicle components, and other types of data. The HPCM 112 and the PCM 114 can each include one or more processors. The one or more processors can execute software instructions stored in the one or more memories. The one or more processors can generate commands to be applied to the motor 102 and the combustion engine 104. The one or more processors can generate commands or signals to be transmitted to other control modules of the vehicle 100. The HPCM 112 and the PCM 114 can be coupled via hardwired connections to each other and to the various components of the vehicle 100. The HPCM 112 and the PCM 114 can also be coupled via wireless connections to each other and to the various components of the vehicle 100.

In one embodiment, the PCM 114 estimates or calculates the additional torque that should be generated by the motor 102 during the transition. The additional torque will be applied to the K0 clutch 106 during the transition to engage the combustion engine 104. The PCM 114 receives sensor signals from sensors associated with the K0 clutch 106 and generates the estimated torque that should be provided moment to moment by the motor 102 the K0 clutch 106. The PCM 114 provides the estimated torque values to the HPCM 112. The HPCM 112 then controls the motor 102 to generate the estimated additional torque to engage the K0 clutch 106.

The amount of torque applied to the K0 clutch 106 during the transition varies throughout the transition. Furthermore, depending on the position and type of sensors associated with the clutch 106, the sensor signals may provide current torque or pressure values that are different than the actual torque or pressure values at various components of the K0 clutch 106. Additionally, there is lag or delay between torque being requested from the motor 102 to the K0 clutch 106 and the torque appearing at components of the K0 clutch 106. Furthermore, there is further lag associated with torque signal transmission and sensor signal transmission. All of these factors complicate the estimation of the torque that should be applied by the motor 102 from moment to moment during the transition.

In order to deal with these complications, the PCM 114 generates a torque lead value that accounts for signal lag, torque application lag, and imperfections in sensor signals due to sensor placement. The PCM 114 generates the torque lead value based on two methods. The first method generates a first torque lead value. The second method generates a second torque lead value. The PCM 114 generates the torque lead value by combining the first torque lead value and the second torque lead value. Respective weighting factors can be applied to the first and second torque lead values prior to combining them to generate the total torque lead value. Details related to the first and second methods for generating the first and second torque lead values are provided in relation to FIG. 2.

After the PCM 114 has generated the torque lead value, the PCM 114 provides the torque lead value to the HPCM 112. The HPCM 112 then causes the motor 102 to generate an additional amount of torque based on the torque lead value and supplies the additional amount of torque to the K0 clutch 106 during the transition. The torque lead value based on the first and second methods results in a smooth transition. In other words, the additional amount of torque generated by the motor 102 results in little or no acceleration or deceleration of the vehicle 100 during the transition because the additional amount of torque is an accurate estimation of the amount of torque that should be generated by the motor 102 from during the transition.

In one embodiment, the HPCM 112 generates the torque lead value by combining first and second torque lead values. In this case, the PCM 114 can apply sensor signals from sensors associated with the K0 clutch to the HPCM 112. The HPCM 112 can then generate the torque lead value and control the motor 102 in accordance with the torque lead value. The sensors associated with the K0 clutch 106 may be directly coupled to the HPCM 112 in some embodiments. Various arrangements of control modules and communication connections can be utilized without departing from the scope of the present disclosure.

Figure 2:
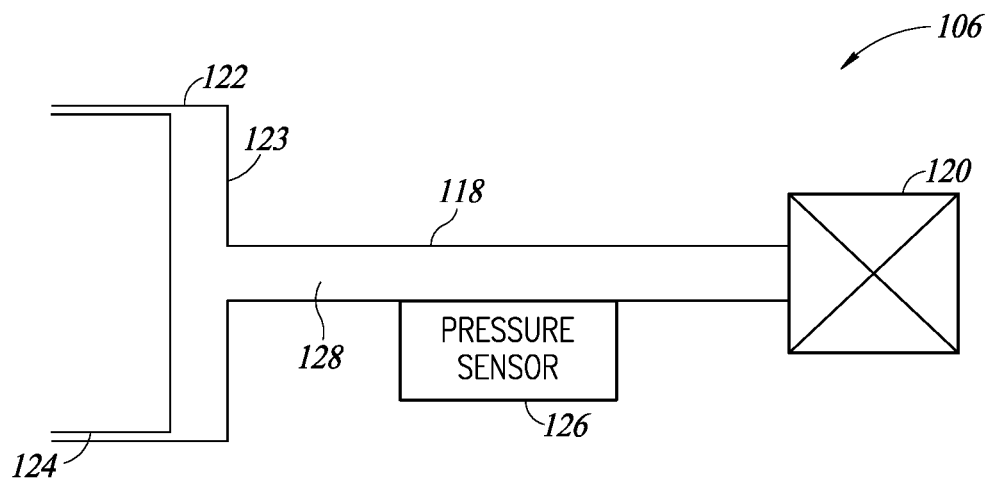
FIG. 2 is an illustration of a K0 clutch of a hybrid vehicle, according to some embodiments.

FIG. 2 is a simplified illustration of a portion of the K0 clutch 106 of FIG. 1, according to one embodiment. The K0 clutch 106 includes a fluid line 118 and a valve 120. The K0 clutch 106 also includes a cylinder 122 and a piston 124 positioned within the cylinder 122. A fluid 128 fills the fluid line 118.

The K0 clutch 106 couples the combustion engine 104 to the drivetrain 111 by retracting the piston 124 within the cylinder 122 away from the end 123 of the cylinder 122. Movement of the piston 124 is accomplished by forcing additional fluid 128 from the valve 120 into the fluid line 118. In effect, pressure is applied from the valve 120 to force the flow of fluid 128 through the fluid line 118 into the cylinder 124. The pressure pushes the piston 124 away from the end 123 of the cylinder 122. As the piston 124 moves, the fluid 128 flows through the fluid line 118 into the cylinder 124.

In the following description, references will be made to both pressure and torque associated with the K0 clutch 106. Pressure and torque are related to each other by a simple relationship:

$$P = k*T + C$$

where P is pressure, T is torque, C is a constant, and k is a conversion factor. Accordingly, the torque lead value can be generated by generating a corresponding pressure lead value and then converting the pressure lead value to a torque lead value. Thus, generating the first and second torque lead values can include first generating first and second pressure lead values and then converting the pressure lead values to the first and second torque lead values.

Movement of the piston 124 is based on the pressure at the head of the piston 124. The pressure at the head of the piston 124 lags behind the pressure applied from the valve 120. The pressure at the valve 120 is applied by a solenoid (not shown). This pressure can be referred to as a command pressure.

The K0 clutch 106 includes a pressure sensor 126. The pressure sensor 126 senses the fluid pressure within the fluid line 118 at a position between the valve 120 and the cylinder 122. The pressure sensor 126 generates sensor signals indicative of the fluid pressure. The sensor signals are provided from the pressure sensor 126 to the PCM 114. Alternatively, the pressure sensor 126 can provide the pressure signals to the HPCM 112.

The pressure at the head of the piston 124 is the factor that causes the piston 124 to move, thereby causing the K0 clutch 106 to engage the combustion engine 104. However, the pressure sensor 126 is not located at the head of the piston. The PCM 114 can estimate the pressure at the piston 124 based on the flow rate Q of the fluid 128 within the fluid line 118. The flow rate Q can be calculated or estimated based on the following formula:

$$Q = (1/Kvs)*(Pv - Ps)$$

where Kvs is a constant corresponding to a pressure resistance between the valve 120 and the pressure sensor 126, Pv is the command pressure at the valve 120, and Ps is the pressure at the pressure sensor 126. The pressure Pp at the piston 124 can be estimated from the flow rate Q based on the following relation:

$$Pp = Ps - Ksp*Q$$

where Ps is the pressure at the location of the pressure sensor, and Ksp is a constant corresponding to a pressure resistance between the pressure sensor 126 and the piston 124. Plugging the formula for Q into the equation above provides the following formula for the piston pressure:

$$Pp = Ps - (Ksp/Kvs)*(Pv - Ps)$$

The first torque lead value Tl1 can be calculated utilizing a first method based on the estimated piston pressure Pp, which is in turn based on the estimated flow rate Q. In particular, the first torque lead value Tl1 can be calculated by the following relationship:

$$Tl1 = Tp*(\tau c*s + 1)/(\tau c - \tau l)*s + 1)$$

where Tp is the torque at the piston 124, τc is a known time delay between the torque requested from request by the PCM 114 appearing at K0 clutch 106, and τl is a selected lead time constant corresponding to the delay of the motor 102 in generating torque commanded by the HPCM. TI is less than TC. As described previously Tp can be estimated from Pp. In one embodiment, TI1 can be generated by first generating a first pressure signal by substituting Pp for Tp in the relationship above. TI1 can then be generated by converting PI1 to TI1 based on the known relationship between pressure and torque described above. The meaning of the first torque lead value TI1 is described more fully in relation to FIG. 3A.

In an embodiment in which the first pressure lead value PI1 is generated in place of or before generating a first torque lead value TI1, the first pressure lead value PI1 can be generated with the following formula:

$$PI1=Pp*(\tau c*s+1)/(\tau c-\tau l)*s+1)$$

The PCM 114 generates a second torque lead value TI2 by a second method. The second method assumes that the K0 clutch response is a first-order system based on the command pressure Pv at the valve 120, or the corresponding command torque Tv at the valve 120. The second torque value is given by the following relationship:

$$TI2=Tv/((\tau c-\tau l)*s+1)$$

Figure 3A:
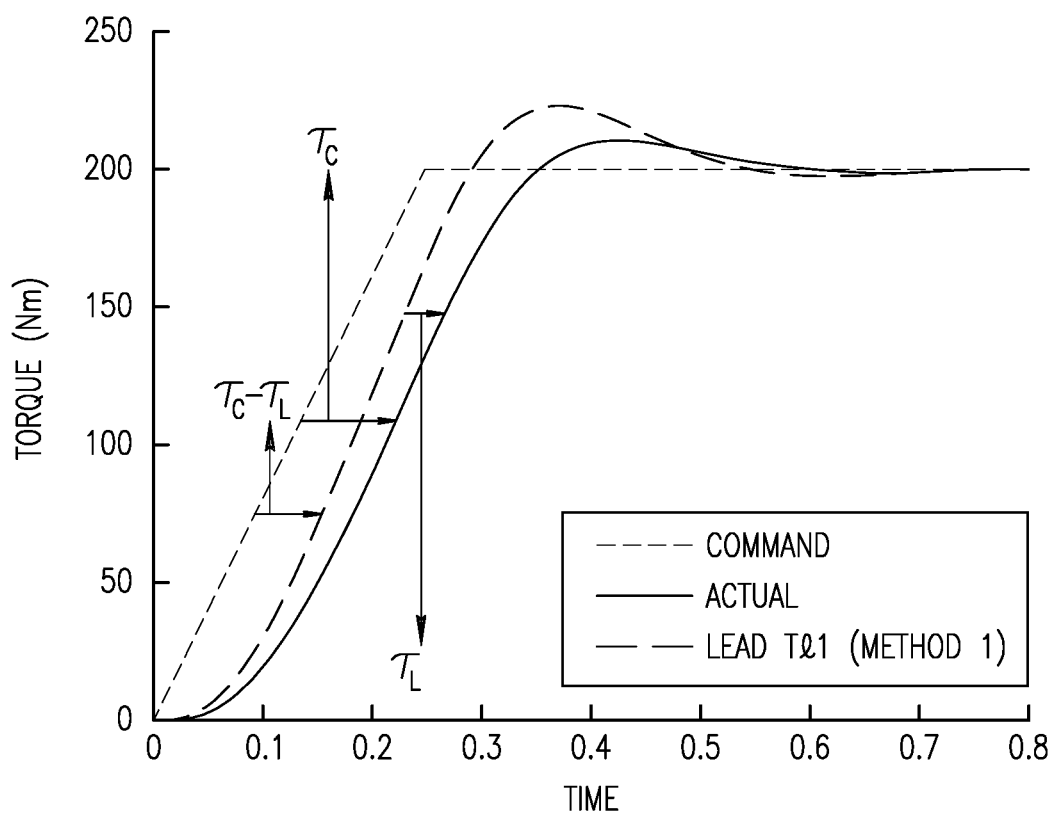
FIGS. 3A-3C are graphs of various torque signals associated with a hybrid vehicle, according to some embodiments.
Figure 3B:
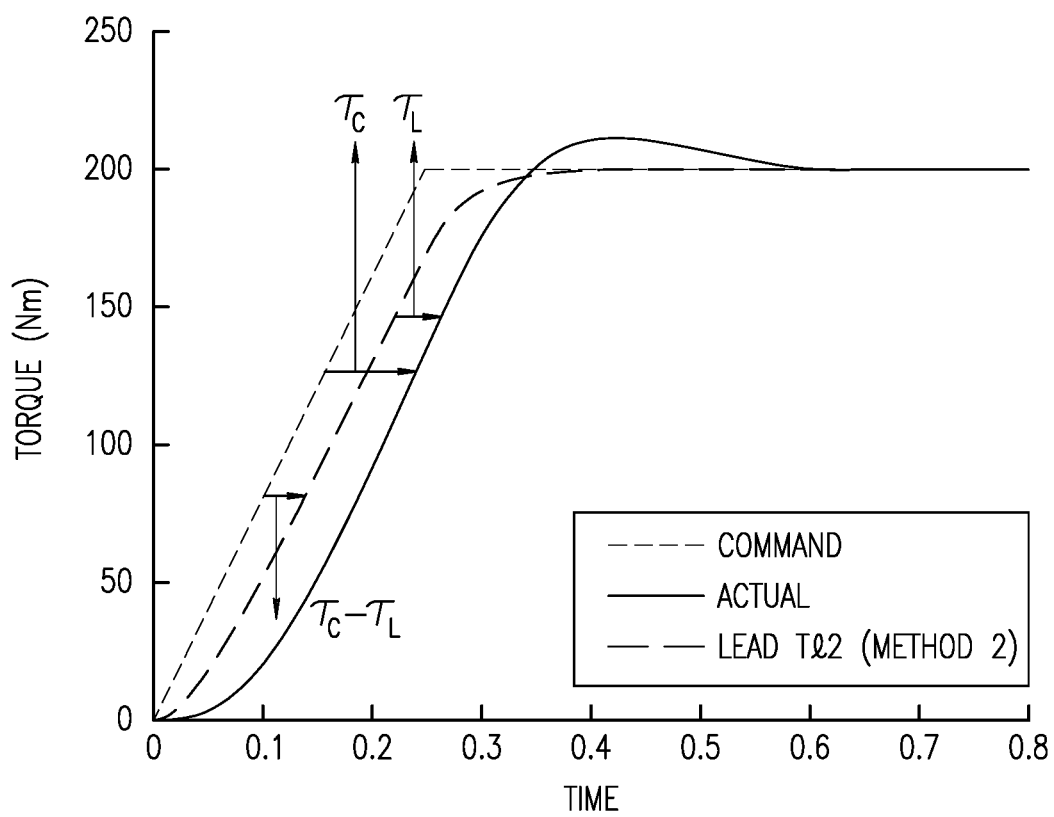

The meaning of the second torque lead value TI2 can be understood with relationship to FIG. 3B. In an embodiment in which a second pressure lead value PI2 is generated in place of or before generating a second torque lead value TI2, the second pressure lead value PI2 can be generated by the second method with the following formula:

$$PI2=Pv/(\tau c-\tau l)*s+1)$$

The total torque lead value TI is generated by combining the first torque lead value and the second torque and signal. As will be understood better with relation to FIGS. 3A-3C, the combination of the first and second torque lead values results in a total torque lead value TI that accurately matches the actual torque that appears at the piston head, with a selected leadtime τl. In practice, the total torque lead value TI is generated by applying weighting values to the first and second torque lead values before combining the first and second torque lead values. The total torque lead value TI can be given by the following relationship:

$$TI=w*TI2+(1-w)*TI1$$

where w is a weighting value between 0 and 1.

FIG. 3A is a graph illustrating various torque values versus time, according to one embodiment. With reference to FIGS. 1, 2, and 3A, the graph of FIG. 3A illustrates a commanded torque, an actual torque, and a first torque lead value TI1. The commanded torque is the desired torque at K0 clutch 106 during a transition from a motor only mode of operation to a hybrid mode of operation that includes both the motor 102 and the combustion engine 104. The actual torque is the value of the torque that appears at K0 clutch 106 after the commanded pressure is applied to the valve 120. The first torque lead value TI1 is a torque lead value generated by the PCM 114 or the HPCM 112 using the first method as described in relation to FIG. 2.

As can be seen from FIG. 3A, when a torque is output by the K0 clutch 106, there is a delay TC between the request of the torque by the PCM 114 and the torque appearing at K0 clutch 106. In the example of FIG. 3A the delay TC is about 100 ms, though other values of the delay are possible based on the particular designs of the K0 clutch 106. Furthermore, the actual torque that appears at the piston 124 does not exactly mirror the command torque after the delay TC. The actual torque has a peak that exceeds the peak of the command torque before settling to the value of the command torque.

The first torque lead value TI1 is generated with the selected lead time τl. The first torque lead value TI1 leads the actual torque by the selected lead time τl. The selected lead time τl is less than the delay TC. The selected lead time τl corresponds to the motor delay in torque. Accordingly, if the motor 102 is commanded a time τl before the actual torque of the K0 clutch 106, then the torque delivered from the motor will be aligned in time the actual K0 torque. In one example, the selected lead time τl is about 40 ms, though other values can be selected without departing from the scope of the present disclosure.

The first torque lead value TI1 has a peak that exceeds the peak of the actual torque. This is because the first method that generates the first torque lead value TI1 is an imperfect estimation of the actual torque with the selected lead time τl. The selected lead time τl is a parameter that can be selected/programmed by design engineers or that can be selected by the various control modules of the vehicle 100 based on the delay of the motor 102 in producing torque.

FIG. 3B is a graph illustrating various torque values versus time, according to one embodiment. With reference to FIGS. 1, 2, and 3B, the graph of FIG. 3B illustrates the command torque, the actual torque, and a second torque lead value TI2. The second torque lead value TI2 is a torque lead value generated by the PCM 114 or the HPCM 112 using the second method as described in relation to FIG. 2.

The second torque lead value TI2 is generated with the selected lead time τl. The second torque lead value TI2 leads the actual torque by the selected lead time τl. The second torque lead value TI2 has a peak that is lower than the peak of the actual torque. This is because the second method that generates the second torque lead value TI2 is an imperfect estimation of the actual torque with the selected lead time τl. Thus, from FIGS. 3A and 3B, we can see that the first torque lead value TI1 overshoots the actual torque while the second torque lead value TI2 undershoots the actual torque.

Figure 3C:
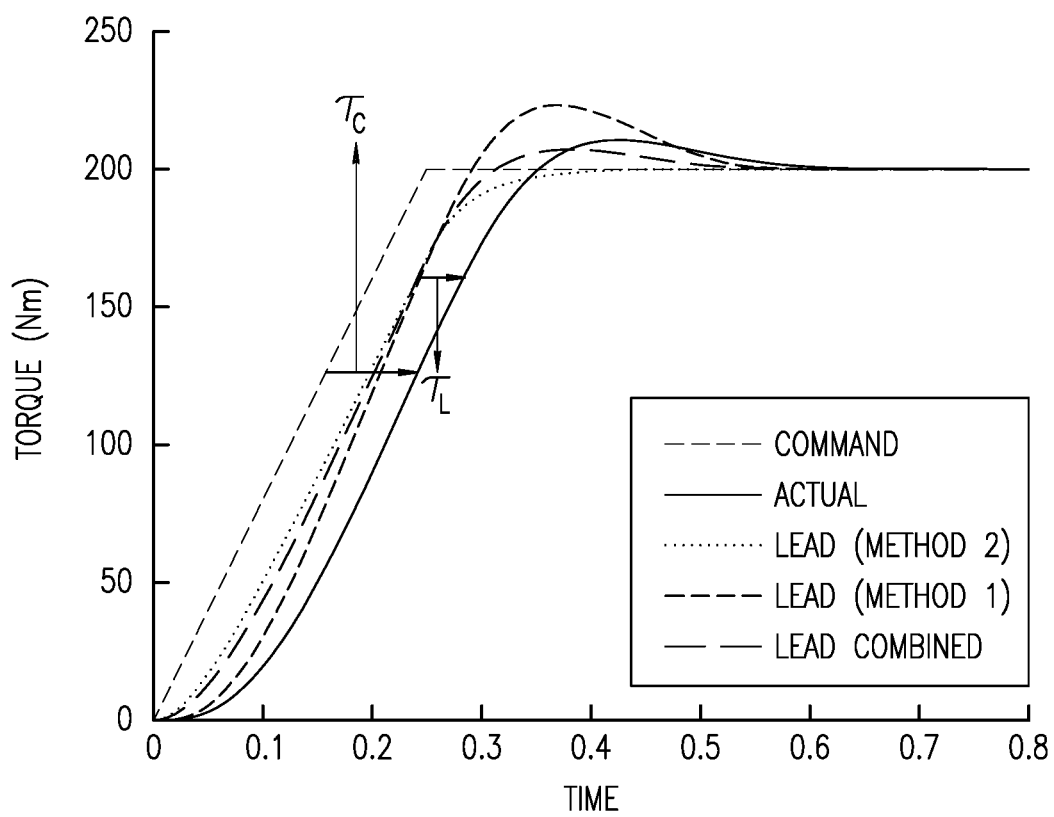

FIG. 3C is a graph illustrating various torque values versus time, according to one embodiment. With reference to FIGS. 1-3C, the graph of FIG. 3C illustrates the command torque, the actual torque, the first torque lead value TI1, the second torque lead value TI2, and the total torque lead value TI correspond to a combination of the first and second torque lead values. As the first torque lead value TI1 overshoots the actual torque and the second torque lead value TI2 undershoots the actual torque, the combination of the first and second torque lead values results in a total torque lead value TI that more closely matches the actual torque, but with the selected lead time τl.

The vehicle 100 can utilize the torque lead value TI to control the torque generated by the motor 102 during transitions between operational modes. The torque lead value can be utilized to generate, with the motor 102, a torque that will result in a smooth transition between operational modes of the vehicle 100. Less energy will be lost during transitions and safety will be improved.

As set forth previously, the first and second torque lead values may be multiplied by respective weighting values. In one embodiment, the weighting values can be dynamically adjusted throughout the transition. In other words, the weighting values can be time-varying weighting values. In this case, the torque lead value TI can be represented by the following formula:

$$TI=w(t)*TI2+(1-w(t))*TI1$$

where w(t) is a time varying weighting value.

The value of the time varying weighting factor w(t) can be generated or selected based on the state of the K0 clutch 106. For example, the time varying weighting factor w(t) can vary based on the current stage of the transition. Different weighting values can be used for the beginning of the transition, the middle of the transition, and the end of the transition. The weighting value w(t) can have a first value while the K0 clutch 106 is starting up, a second value while the combustion engine 106 the starting up or beginning to generate torque, and a third value while the clutch is locking. Various values for the weighting value w(t) can be utilized for various stages of the transition without departing from the scope of the present disclosure.

In one embodiment, the weighting factor w(t) can be dynamically generated based on the magnitude of a normalized error. The error can correspond to the difference between a measured torque Tm and the expected torque, Tinst, based on the torque lead signal TI. In one example, the normalized error $err_{norm}$ can be calculated in the following manner:

$$err_{norm} = \left| \frac{(T_m - T_{inst})}{(T_{cmd} - T_{inst})} \right|$$

where Tcmd is a commanded torque. The weighting factor w(t) can vary as the normalized error varies. Additionally, the weighting factor w(t) can have a different upper limit based on the current stage of the transition.

In one embodiment, the torque lead signal can be calculated in the following manner:

$T_l = T_{l1} + (1 - w(t)) \cdot T_{cor}$ where Tcor is a torque correction value. The torque correction value can be calculated in the following manner:

$Tcor = Tm - Tinst$ where Tinst is the expected torque based on the most recent previous value of the torque lead signal TI. In this example, the torque lead signal is based on the first torque lead signal TI1, the time varying weighting value w(t), and the torque correction value Tcor.

Figure 4:
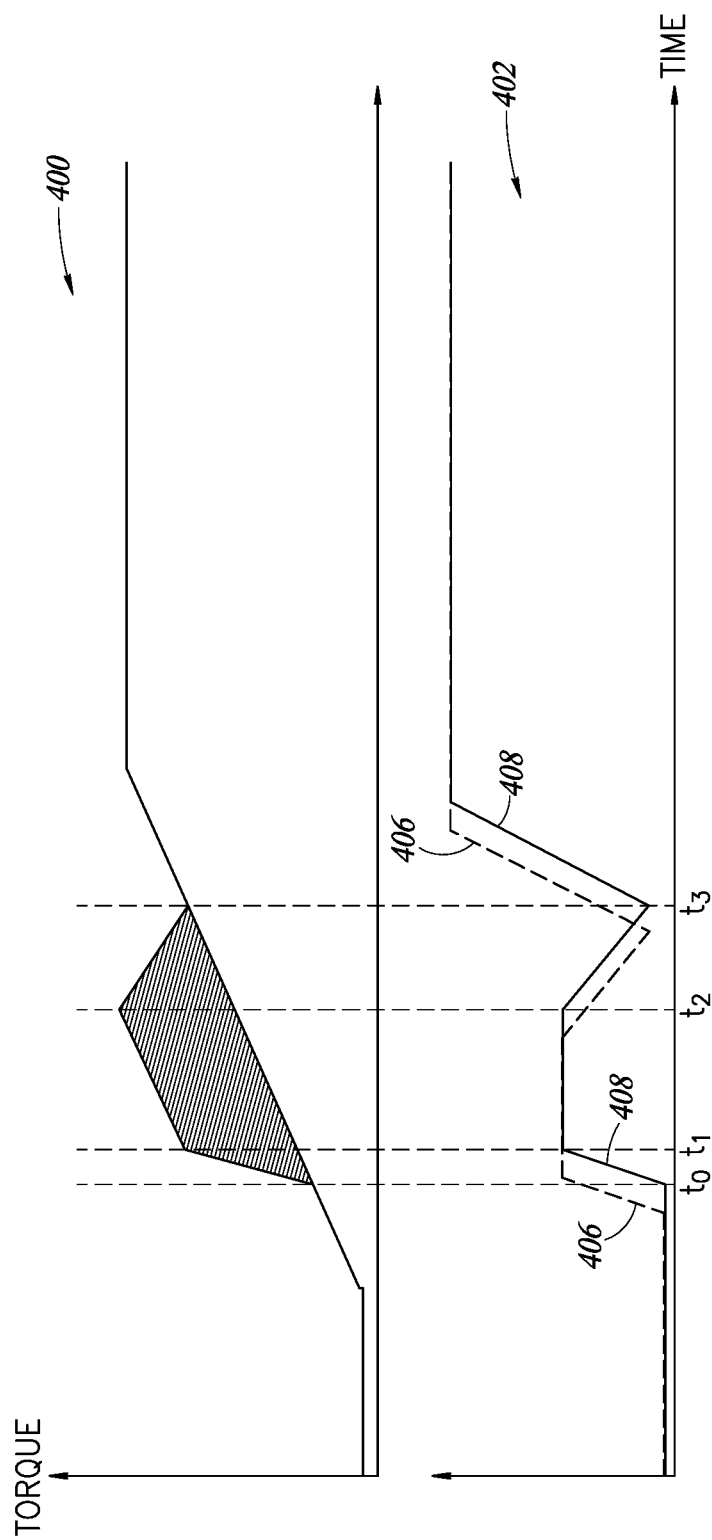
FIG. 4 illustrates graphs of torque values associated with a transition between operational modes of a hybrid vehicle, according to some embodiments.

FIG. 4 illustrates graphs 400 and 402 indicating torques associated with transitions between a motor only operational mode and a combination of motor and combustion engine operational mode, according to one embodiment. FIG. 4 will be described with reference to FIG. 1-3C. The graph 400 indicates the torque output by the motor during the transition. The transition begins at time T0 and ends at time T3. As can be seen from the graph 400, the torque provided by the motor 102 increases beginning at time T0 in order to compensate for drag introduced to the drivetrain while the K0 clutch 106 engages the combustion engine 104.

The graph 402 includes the torque lead signal 406. The torque lead signal 406 is calculated in accordance with the combination of methods described previously in relation to FIGS. 1-3C. As can be seen from the graph 402, the torque lead signal 406 leads the actual torque output from the motor 102 as shown in the graph 400. For example, the torque lead signal 406 begins to increase before the time T0. In particular, the torque lead signal 406 leads the actual torque by the selected lead time τl.

The graph 402 also illustrates the K0 clutch capacity 408. The K0 clutch capacity 408 aligns with the timing of the torque output by the motor 102 during the transition as indicated in the graph 400. The K0 clutch capacity 408 can affect the performance of the vehicle 100 during the transition. In particular, after the combustion engine 104 starts up, the combustion engine 104 outputs a torque. If the torque output by the combustion engine during the transition exceeds the capacity of the K0 clutch 106, then there may be slippage in the K0 clutch 106.

To avoid slippage in the K0 clutch 106, the vehicle 100 estimates the capacity of the K0 clutch throughout the transition. The vehicle 100 limits the torque output from the combustion engine 104 to a value less than the current capacity of the K0 clutch 106. This helps prevent any slippage in the K0 clutch 106 during the transition.

In one embodiment, the vehicle 100 estimates the capacity of the K0 clutch 106 based on the piston pressure of the K0 clutch 106. In particular, the capacity of the K0 clutch is estimated by estimating the piston pressure based on the pressure sensed by the pressure sensor 126, as described above, but without the selected lead time. The estimated piston pressure is then converted to an estimated piston torque, as described above. The estimated piston torque is continuously updated throughout the transition. The estimated piston torque corresponds to the estimated capacity 408 of the K0 clutch. During the transition, the vehicle 100 limits the torque output by the combustion engine 104 to a value less the estimated capacity 408 of the K0 clutch.

The PCM 114 can generate the estimated the estimated K0 clutch capacity 408 based on the pressure sensor 126. The PCM supplies a torque command signal to the combustion engine 104. The combustion engine 104 outputs a torque in accordance with the torque command signal. The PCM 114 limits the torque command signal provided to the combustion engine 104 to a value less than the estimated K0 clutch capacity 408.

Figure 5:
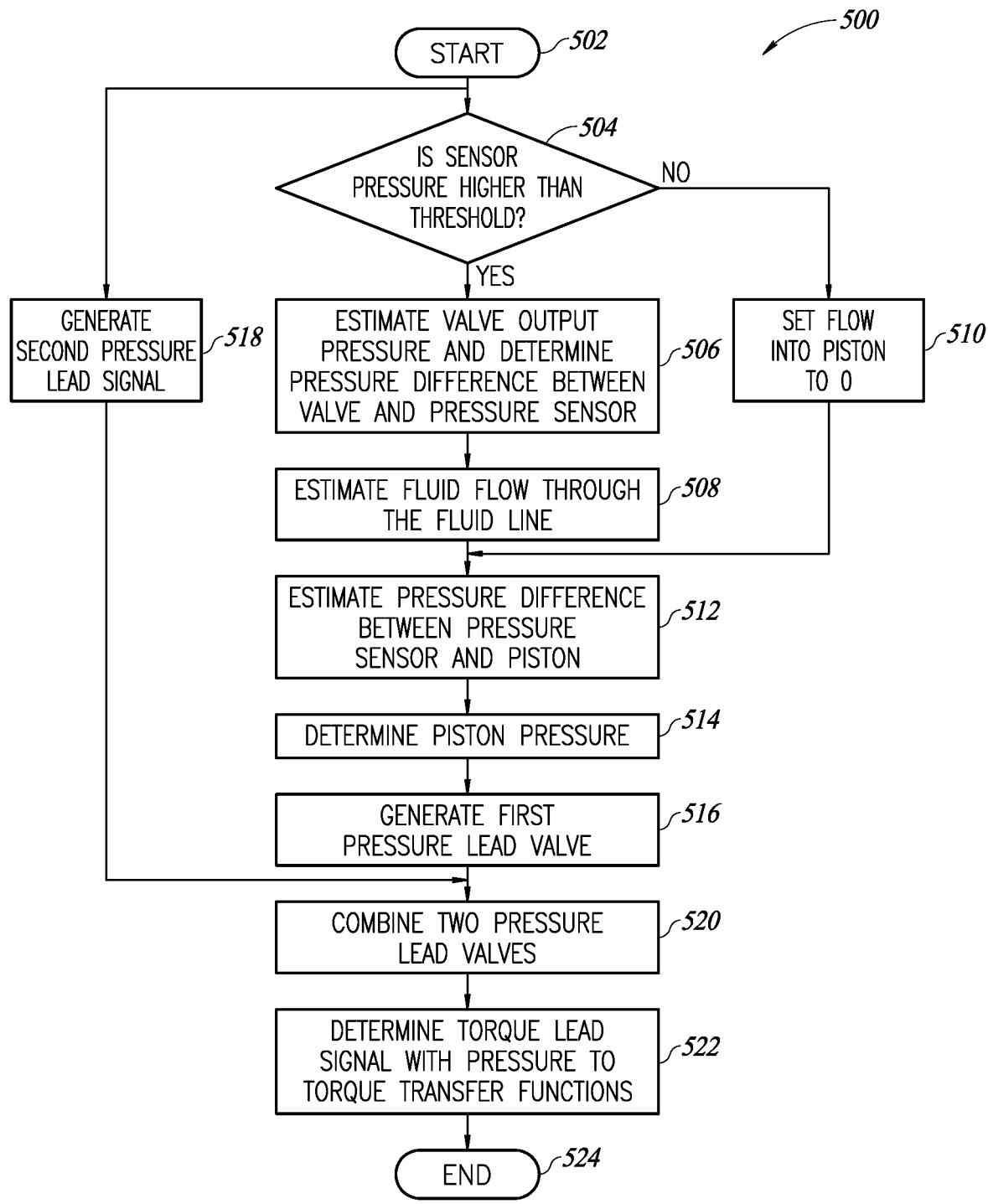
FIGS. 5-7 are flow diagrams of processes for operating a hybrid vehicle, according to some embodiments.

FIG. 5 is a process 500 for operating a vehicle during the transition between operational states of the vehicle, according to one embodiment. The process 500 can utilize components, systems, and processes described in relation to FIGS. 1-3C. At 502, the process 500 begins. The description of FIG. 5 will be made with reference to FIGS. 1, 2, and 3A. At 504, the process 500 determines whether the pressure at the pressure sensor is higher than a threshold pressure. In one example, the PCM 114 or the HPCM 112 receives sensor signals from the pressure sensor 126 and determines whether the pressure at the pressure sensor 126 is higher than a threshold pressure. If the pressure at the pressure sensor is higher than the threshold pressure, the process 500 proceeds to 506.

At 506, the process 500 estimates the output pressure at the valve of the K0 clutch. At 506 the process 500 determines the pressure difference between the valve and the pressure sensor. In one example, the PCM 114 or the HPCM 112 estimates the valve pressure based on the torque supplied by the motor 102. The PCM 114 or the HPCM 112 then determines the pressure difference between the valve 120 and the pressure sensor 126. From 506, the process 500 proceeds to 508.

At 508, the process 500 estimates the fluid flow through the fluid line 118 of the K0 clutch 106. As described previously in relation to FIG. 2, the flow rate Q of fluid within the fluid line 118 of the K0 clutch 106 can be estimated based on the pressure difference between the valve 120 and the pressure sensor 126 and the pressure resistance value Kvs representing the pressure resistance between the valve 120 and the sensor 126. The PCM 114 or the HPCM 112 can make the estimation of the flow rate Q.

Returning to 504, if the pressure at the pressure sensor is lower than the threshold, the process 500 proceeds to 510. At 510, the process 500 sets the flow rate within the piston 124 of the K0 clutch 106 to 0. In one example, the PCM 114 or the HPCM 112 sets the value of the flow rate to 0. From 510 or 508, the process 500 proceeds to 512.

At 512, the process 500 estimates the pressure difference between the pressure sensor 126 and the piston 124. In one example, the PCM 114 or the HPCM 112 can estimate the pressure difference between the pressure sensor 126 and the piston 124. The pressure difference between the pressure sensor 126 and the piston 124 can be generated based on the flow rate Q and the pressure resistance value Ksp corresponding to the pressure resistance between the pressure sensor 126 and the piston 124. From 512, the process proceeds to 514.

At 514, the process 500 determines the pressure at the piston 124. As described previously in relation to FIG. 2, the pressure at the piston can be determined based on the pressure at the pressure sensor 126, the pressure output at the valve 120, and the pressure resistance constants Ksp and Kvs. In one example, the PCM 114 or the HPCM 112 can determine the pressure at the piston 124. From 514, the process proceeds to 516.

At 516, the process 500 generates the first pressure lead value using the first method. The description of FIG. 2 detailed determining a first torque lead value TI1 using the first method. However, as previously noted, a simple conversion enables torque to be calculated from pressure or pressure to be calculated from torque. Accordingly, in one embodiment, a first pressure lead value PI1 is generated using the first method. The first method generates the pressure lead value based on the pressure at the piston 124, the delay time TC, and the selected lead time τl. In one example, the PCM 114 or the HPCM 112 can generate the first pressure lead value.

At 518, the process 500 generates the second pressure lead value PI2 utilizing the second method. As described previously, the second method generates the second pressure lead value PI2 based on the command pressure at the valve 120, the delay time TC, and the selected lead time τl. The description of FIG. 2 detailed determining a second torque lead value TI2 using a second method. However, as noted above, a second pressure lead value can be generated using the first method but substituting pressure values for torque values. In one example, the PCM 114 or the HPCM 112 can generate the second pressure lead value. After the first and second pressure lead values are generated at 516 and 518, the process 500 proceeds to 520.

At 520, the process 500 generates a total pressure lead value PI by combining the first pressure lead value PI1 and the second pressure lead value PI2. The combination can include multiplying the first and second pressure lead values PI1 and PI2 by respected weighting factors, as described previously in relation to FIG. 2. The PCM 114 or the HPCM 112 can generate the total pressure lead value PI. from 520, the process proceeds to 522.

At 522, the process 500 determines the total torque lead value TI by applying a pressure-to-torque transfer function. In one example, the PCM 114 or the HPCM 112 can generate the total torque link signal TI. At 524, the process 500 ends.

FIG. 5 provides an example in which the torque lead value TI is generated by first generating first and second pressure lead values by respective first and second methods. This may be convenient because the pressure sensor 126 provide pressure signals that can be readily use in generating the first pressure lead value. However, as has been described previously, the torque lead value TI can be generated by directly generating first and second torque lead values TI1 and TI2 rather than by first generating first and second pressure lead values PI1 and PI2.

Examples have been given in which the PCM 114 or the HPCM 112 perform various estimations and calculations. However, depending on the configuration of the vehicle 100, other control modules can be utilized to perform the calculations and estimations utilized in generating the torque lead value TI.

Figure 6:
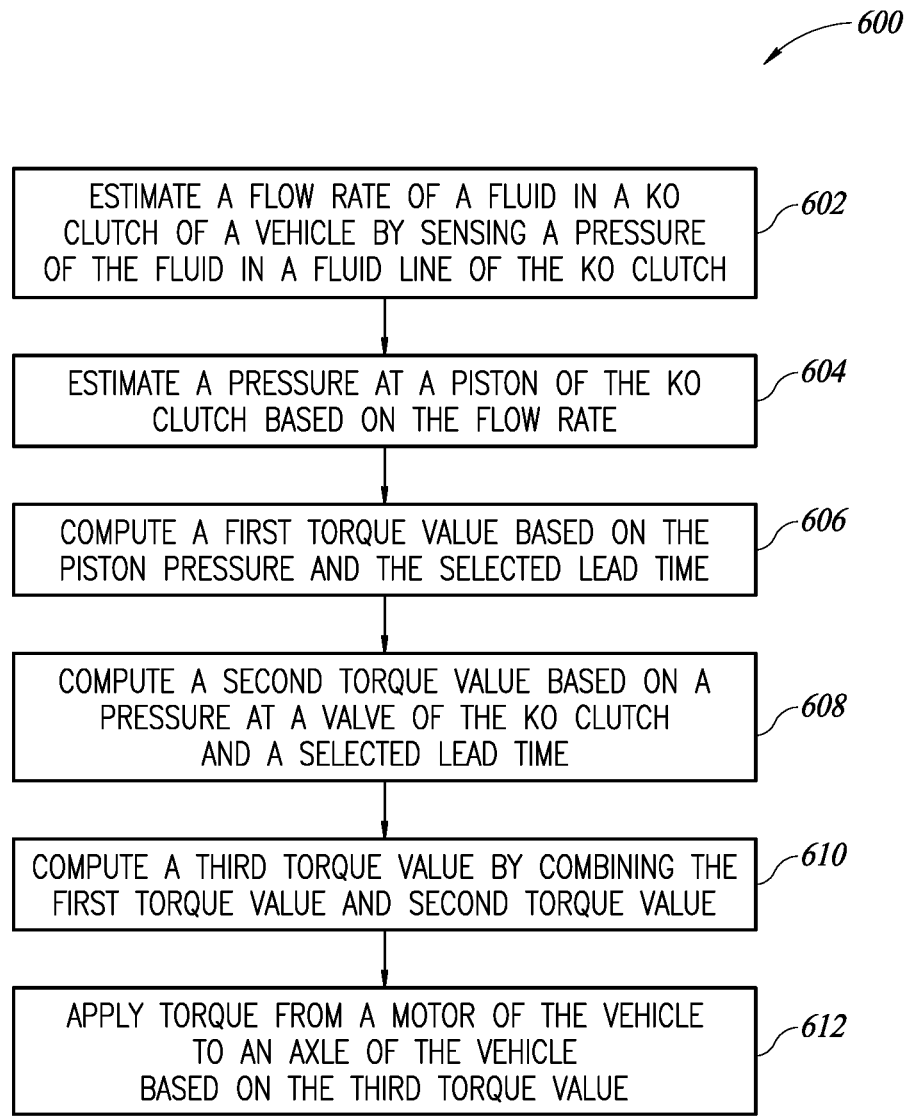

FIG. 6 is a flow diagram of a method 600 for operating a hybrid vehicle, according to one embodiment. The method 600 can utilize components, systems, and processes described in relation to FIGS. 1, 2, 3A, 3B, 3C 4 and 5. At 602, the method 600 includes estimating a flow rate of a fluid in a K0 clutch of a vehicle by sensing a pressure of the fluid in a fluid line of the K0 clutch. At 604, the method 600 includes estimating a pressure at a piston of the K0 clutch based on the flow rate. At 606, the method 600 includes computing a first torque value based on the pressure at the piston and the selected lead time. At 608, the method 600 includes computing a second torque lead value based on a pressure at a valve of the K0 clutch and a selected lead time. At 610, the method 600 includes computing a third torque lead value by combining the first torque lead value and the second lead torque value. At 612, the method 600 includes applying torque from a motor of a vehicle based on the third torque value.

Figure 7:
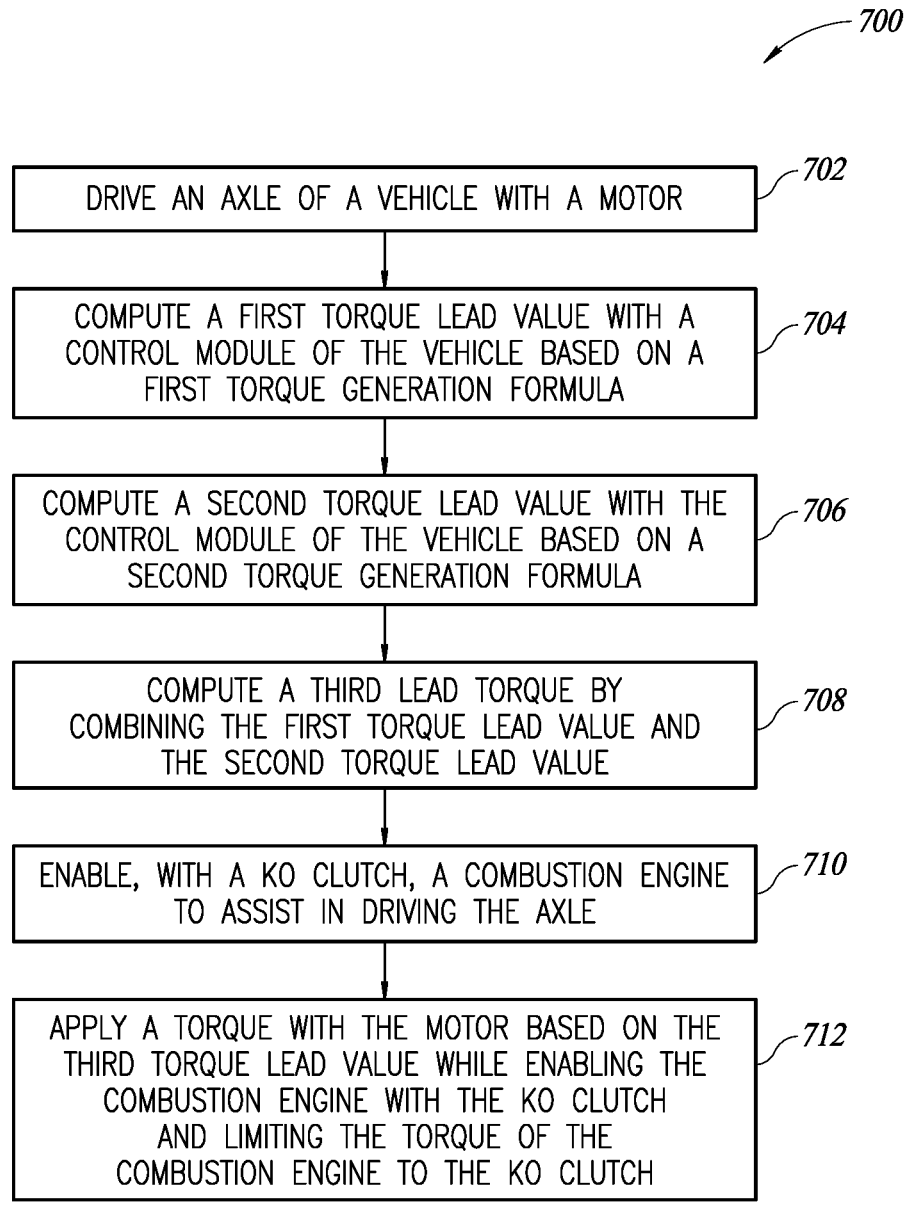

FIG. 7 is a flow diagram of a method 700 for operating a hybrid vehicle, according to one embodiment. The method 700 can utilize components, systems, and processes described in relation to FIGS. 1, 2, 3A, 3B, 3C, and 4-6. At 702, the method 700 includes driving an axle of a vehicle with a motor. At 704, the method 700 includes computing a first torque lead value with a control module of the vehicle based on a first torque generation formula. At 706, the method 700 includes computing a second torque lead value with the control module of the vehicle based on a second torque generation formula. At 708, the method 700 includes computing a third torque lead value by combining the first torque lead value and the second torque lead value. At 710, the method 700 includes enabling, with a K0 clutch, a combustion engine to assist in driving the axle. At 712, the method 700 includes applying a torque with the motor based on the third torque lead value while enabling the combustion engine with the K0 clutch and limiting the torque of the combustion engine to the K0 clutch torque.

In one embodiment, a method includes estimating a flow rate of a fluid in a K0 clutch of a vehicle by sensing a pressure of the fluid in a fluid line of the K0 clutch, estimating a pressure at a piston of the K0 clutch based on the flow rate, and computing a first torque value based on the pressure at the piston and the selected lead time. The method includes computing a second torque lead value based on a pressure at a valve of the K0 clutch and a selected lead time, computing a third torque lead value by combining the first torque lead value and the second lead torque value, and applying torque from a motor based on the third torque value.

In one embodiment, a vehicle includes an axle, a motor configured to drive the axle, and a combustion engine. The vehicle includes a K0 clutch coupled between the motor and the combustion engine and configured to selectively enable the combustion engine to drive the axle. The vehicle includes a first control module coupled to the K0 clutch and con d to generate a first lead torque value, a second torque lead value, and a third torque lead value based on the first and second torque lead values.

In one embodiment, a method includes driving an axle of a vehicle with a motor, computing a first torque lead value with a control module of the vehicle based on a first torque generation formula, and computing a second torque lead value with the control module of the vehicle based on a second torque generation formula. The method includes computing a third torque lead value by combining the first torque lead value and the second torque lead value, enabling, with a K0 clutch, a combustion engine to assist in driving the axle, and applying a torque with the motor based on the third torque lead value while enabling the combustion engine with the K0 clutch.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:
   estimating a first pressure at a first location of a clutch based on a flow rate of a fluid in the clutch;
   computing a first torque lead value based on the first pressure;
   computing a second torque lead value based on a second pressure;
   computing a third torque lead value by combining the first torque lead value and the second torque lead value; and
   applying torque from a motor of the vehicle based on the third torque lead value.

2. The method of claim 1, further comprising computing the third torque lead value with a powertrain control module coupled to the clutch and a combustion engine.

3. The method of claim 2, further comprising providing the third torque lead value from the powertrain control module to a hybrid powertrain control module of the vehicle.

4. The method of claim 3, further comprising controlling, with the hybrid powertrain control module, the motor to provide the torque to the clutch based on the third torque lead value.

5. The method of claim 1, further comprising:
   driving an axle of the vehicle with the motor prior to computing the third torque lead value; and
   enabling a combustion engine of the vehicle to drive the axle by coupling the combustion engine with a drivetrain of the vehicle with the clutch, wherein the third torque lead value compensates for the clutch coupling the combustion engine to the drivetrain.

6. The method of claim 1, further comprising driving an axle with both a combustion engine and the motor after enabling the combustion engine to drive the axle.

7. The method of claim 1, further comprising generating the first and second torque lead values based, in part, on a time delay value corresponding to a delay in providing torque from the motor.

8. The method of claim 7, further comprising generating the first and second torque lead values based, in part, on the time delay value and a selected lead time value less than the time delay value.

9. The method of claim 1 further comprising:
   generating the first torque lead value by:
      generating a first pressure lead value based on a piston pressure and a selected lead time; and
      applying a transfer function to the first pressure lead value; and
   generating the second torque lead value by:
      generating a second pressure lead value based on a pressure at a valve and the selected lead time; and
      applying a transfer function to the second pressure lead value.

10. The method of claim 1, wherein the flow rate of the fluid in the clutch of the vehicle is estimated by sensing a pressure of the fluid in a fluid line of the clutch.

11. The method of claim 1, wherein the second pressure is estimated at a second location of the clutch, the second location being different than the first location.

12. The method of claim 11, wherein the first location is at a piston of the clutch and the second location is at a valve of the clutch.

13. The method of claim 1, wherein the first torque lead value is computed based on the first pressure and a selected lead time and the second torque lead value is computed based on the second pressure and the selected lead time.

14. A method comprising:
  estimating a flow rate of a fluid in a clutch of a vehicle;
  estimating a first pressure at a first location of the clutch based on the flow rate;
  computing a first torque lead value based on the first pressure, a selected lead time value, and a delay time value;
  computing a second torque lead value based on a second pressure, the selected lead time value, and the delay time value, the second pressure is estimated at a second location of the clutch that is different than the first location;
  computing a third torque lead value by combining the first torque lead value and the second torque lead value; and
  applying torque from a motor of the vehicle based on the third torque lead value.

15. The method of claim 14, further comprising computing the third torque lead value with a powertrain control module coupled to the clutch and a combustion engine.

16. The method of claim 15, further comprising providing the third torque lead value from the powertrain control module to a hybrid powertrain control module of the vehicle.

17. The method of claim 16, further comprising controlling, with the hybrid powertrain control module, the motor to provide the torque to the clutch based on the third torque lead value.

18. The method of claim 14, wherein the flow rate of the fluid in the clutch of the vehicle is estimated by sensing a pressure of the fluid in a fluid line of the clutch.

19. The method of claim 14, wherein the first location is at a piston of the clutch and the second location is at a valve of the clutch.

20. A method, comprising:
  estimating a flow rate of a fluid in a clutch of a vehicle by sensing a pressure of the fluid in a fluid line of the clutch;
  estimating a pressure at a piston of the clutch based on the flow rate;
  computing a first torque lead value based on the estimated pressure at the piston, a selected lead time value, and a delay time value;
  computing a second torque lead value based on a pressure at a valve of the clutch, the selected lead time value, and the delay time value;
  computing a third torque lead value by combining the first torque lead value and the second torque lead value; and
  applying torque from a motor of the vehicle to an axle of the vehicle based on the third torque lead value,
  wherein the axle of the vehicle is driven by the motor prior to computing the third torque lead value.

* * * * *